United States Patent [19]
Mouri

[11] Patent Number: 5,690,361
[45] Date of Patent: Nov. 25, 1997

[54] STEERING SYSTEM FOR AUTOMOTIVE VEHICLES

[75] Inventor: Hiroshi Mouri, Yokohama, Japan

[73] Assignee: Nissan Motor Co., Ltd., Yokohama, Japan

[21] Appl. No.: 695,364

[22] Filed: Aug. 9, 1996

Related U.S. Application Data

[63] Continuation of Ser. No. 412,160, Mar. 28, 1995, abandoned.

[30] Foreign Application Priority Data

Mar. 28, 1994 [JP] Japan ................... 6-57177

[51] Int. Cl.$^6$ .................. B62D 1/00; F16D 3/76
[52] U.S. Cl. .................. 280/771; 180/78; 180/79; 464/89; 464/180; 74/492; 74/498
[58] Field of Search ................... 280/771, 779, 280/89, 90, 94; 180/78, 79; 267/281, 141.2; 464/82, 83, 89, 90, 91, 162, 180; 74/492, 498, 583

[56] References Cited

U.S. PATENT DOCUMENTS

| | | | |
|---|---|---|---|
| 4,310,063 | 1/1982 | Nishikawa | 74/492 |
| 4,479,786 | 10/1984 | De Bisschop | 464/89 |
| 4,634,135 | 1/1987 | Nakata et al. | 280/90 |
| 4,667,530 | 5/1987 | Mettler et al. | 464/89 |

FOREIGN PATENT DOCUMENTS

| | | | |
|---|---|---|---|
| 4220417 | 12/1993 | Germany | 280/771 |
| 60-161251 | 8/1985 | Japan . | |
| 2-63963 | 3/1990 | Japan . | |

OTHER PUBLICATIONS

Eguchi et al., "The Development of a Rear-Wheel Steering System with Motor-Driven Servo Control," Automobile Technique Society, pp. 203-206, 1993.

*Primary Examiner*—Paul N. Dickson
*Attorney, Agent, or Firm*—Foley & Lardner

[57] ABSTRACT

A steering system for an automotive vehicle provides an improved steering response characteristic and has has an elastic member which is included in a transmission path from a steering wheel to tires of the vehicle to be operated by the steering wheel, such as a steering column coupling which is elastically deformed according to the rotation of a steering column shaft, or a rack insulator for elastically supporting a rack housing of a rack/pinion steering mechanism. The elastic member is comprised of a spring element and a damping element of which the ratio C/K of the damping coefficient C to the spring constant K is such that C/K is greater than $1/(10\pi)$.

21 Claims, 5 Drawing Sheets

FIG_1
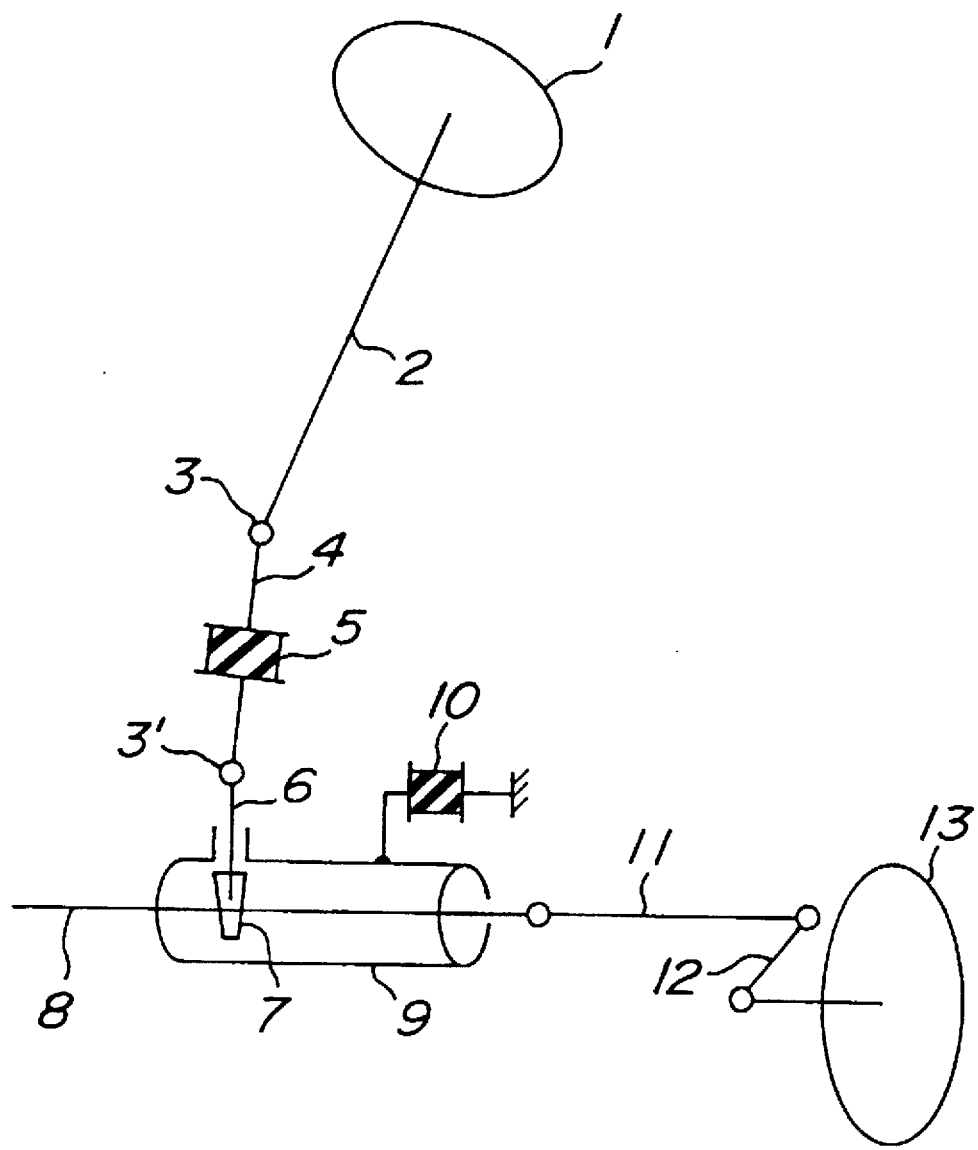

FIG_2
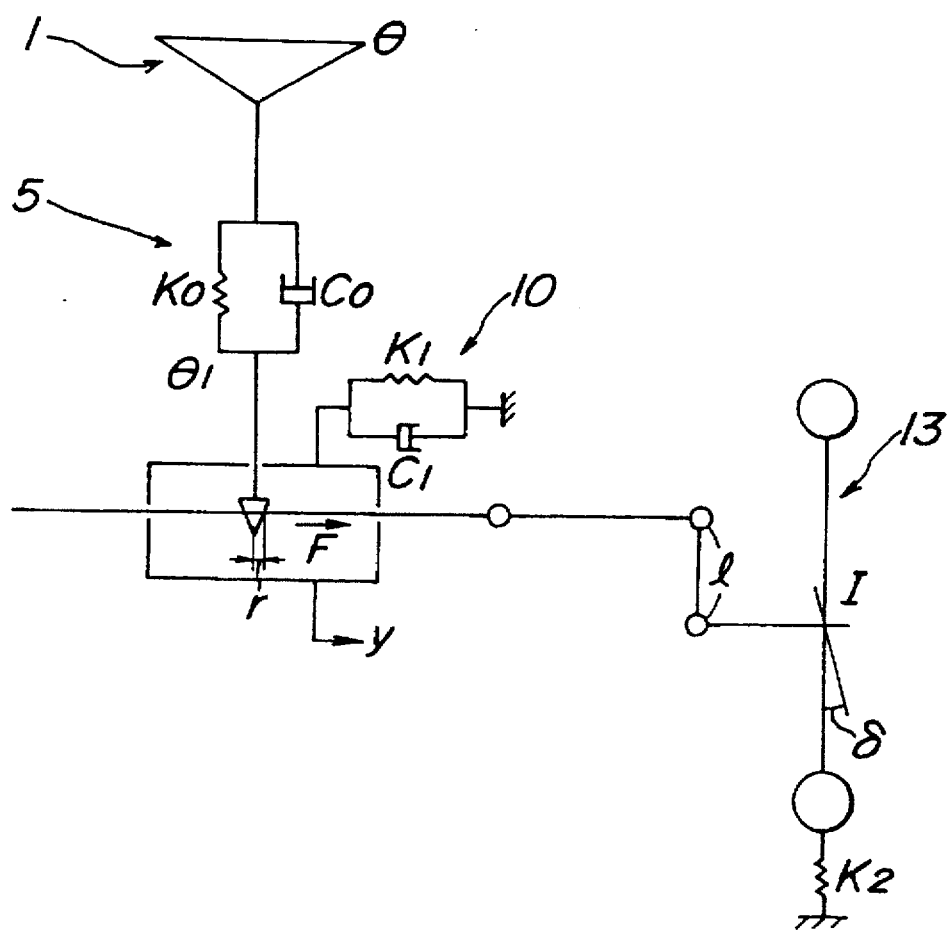

FIG_3
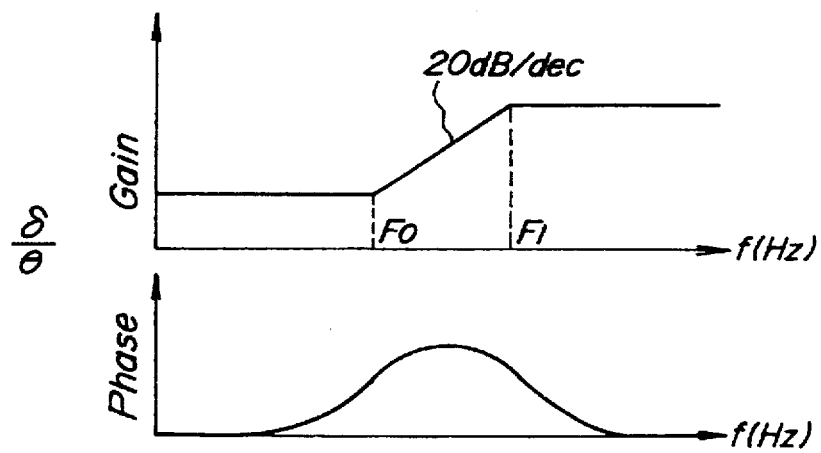
$$F_o = \frac{K_o}{2\pi C_o} \text{(Hz)} \quad F_1 = \frac{(K_1 + \frac{NK_o}{\ell})\frac{K_2}{\ell} + NK_oK_1}{2\pi N(\frac{K_2}{\ell^2} + K_1)C_o} \text{(Hz)}$$
FIG_4
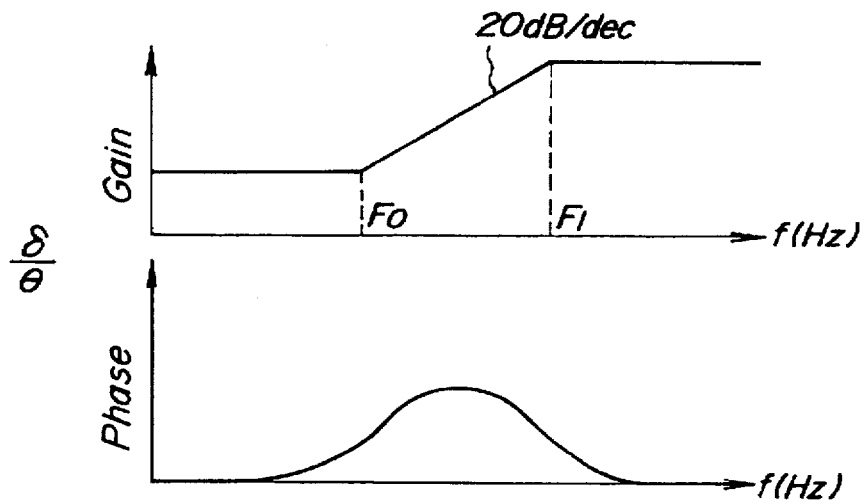
$$F_o = \frac{K_1}{2\pi C_1} \text{(Hz)} \quad F_1 = \frac{NK_oK_1 + (K_1 + \frac{NK_o}{\ell})\frac{K_2}{\ell}}{2\pi(\frac{K_2}{\ell} + K_oN)C_1} \text{(Hz)}$$

FIG_5a
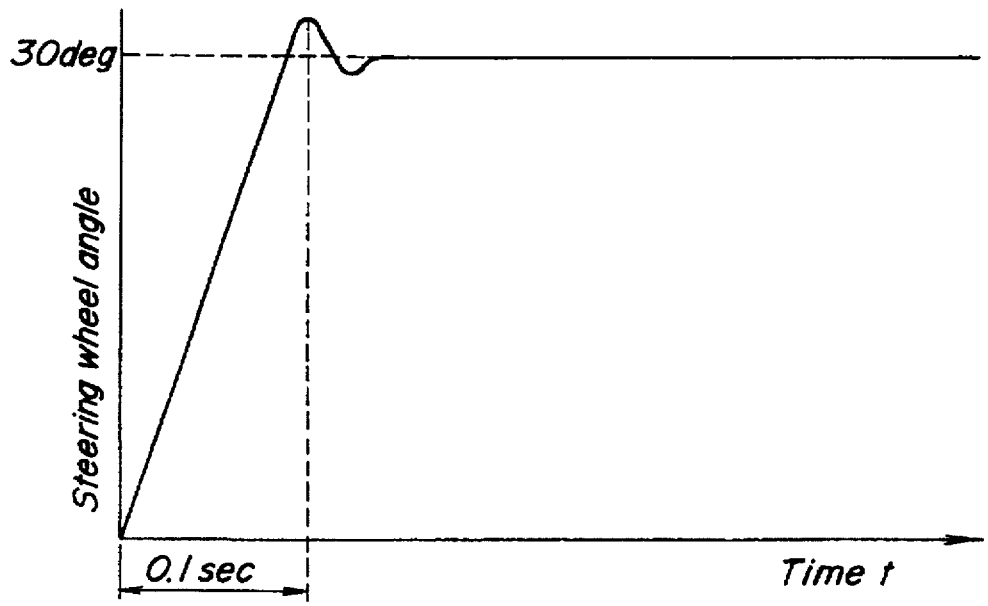
FIG_5b
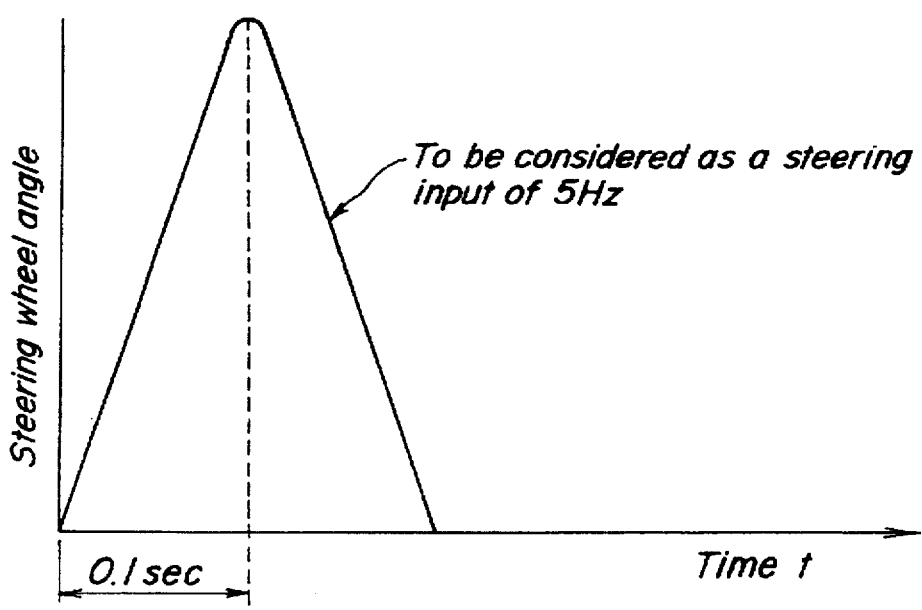

STEERING SYSTEM FOR AUTOMOTIVE VEHICLES

This application is a continuation of application Ser. No. 08/412,160, filed Mar. 28, 1995, now abandoned.

BACKGROUND OF THE INVENTION

1. Field of the present Invention

The present invention relates to a steering system for automotive vehicles. More specifically, the invention pertains to a steering system which provides an improved steering response characteristic and a refined driving feel.

2. Description of the Related Art

A steering system for automotive vehicles includes a steering wheel to be manually operated by a driver and a steering device for transmitting a steering input from the steering wheel to tires of the vehicle.

There is known a steering system wherein the steering device includes an elastic member comprised of a spring element and a damping element. For example, JP-A-60-161251 discloses a steering system wherein the steering device includes a rack mount insulator arranged between the chassis of the vehicle and a rack housing of a rack/pinion steering mechanism, and wherein the rack mount insulator is comprised of a spring member and a damping cylinder. Furthermore, JP-A-2-63963 discloses a steering system wherein the steering device includes a steering shaft connected to the steering wheel, and wherein the steering shaft is provided with a spring element and a damping element which exhibit higher spring constant and damping coefficient, respectively, with an increased gain of the steering response characteristic of the steering input angle.

While these proposals proved to be highly effective for achieving the respectively intended functions, it would be desirable to further improve the steering response characteristic of the vehicle and thereby refine the driving feel.

SUMMARY OF THE INVENTION

It is therefore an object of the present invention to provide a steering system which realizes an improved steering response characteristic of the vehicle and a refined driving feel, and which is yet simple and less expensive in structure and highly reliable in operation.

The present invention is based on a recognition that, when damping is applied to an elastic member of the steering system such as a steering column coupling or a rack insulator, the ratio of the the damping coefficient to the spring constant plays a significantly important role, in order to improve the steering response characteristic and refine the driving feel.

In this connection, taking into consideration an actual steering frequency region of drivers, the inventor found it particularly advantageous to optimize the ratio of the damping coefficient to the spring constant such that the frequency band, which results in advanced phase and increased gain of the actual front wheel steering angle, is matched with the frequency band of the steering angle generated under a normal driving condition. Such optimization of the ratio of the damping coefficient to the spring constant serves to realize an improved steering response characteristic in a frequency band which corresponds an improved maneuverability and stability of the vehicle.

Thus, according to the present invention, there is provided a steering system for an automotive vehicle, comprising a steering wheel to be manually operated by a driver and a steering device for transmitting a steering input from the steering wheel to tires of the vehicle, said steering device including an elastic member which comprises a spring element with a spring constant K and a damping element with a damping coefficient C, wherein a ratio C/K of the damping coefficient C to the spring constant K is such that C/K is greater than $1/(10\pi)$.

In the steering system according to the present invention, an elastic member included in the steering device is comprised of a spring element and a damping element, and has a ratio C/K of the damping coefficient C to the spring constant K, and the ratio C/K is set such that C/K is greater than $1/(10\pi)$. It is thus possible to match the frequency band, which provides an increased gain and advanced phase of the front wheel steering angle respect to a steering wheel angle, with the frequency band of the steering wheel operating angle generated during normal driving condition. Therefore, during a normal steering operation by a driver of the vehicle, the phase characteristic of the front wheel steering angle with respect to the steering wheel operating angle can be improved within a frequency band corresponding to steering stability, thereby to realize an excellent steering response characteristic and refined driving feel.

According to a preferred embodiment of the present invention, the elastic member is a column coupling included in the steering device, which is elastically deformed according to the rotation of a steering column shaft. In this instance, the column coupling may be made of a high damping rubber material having a damping property which satisfies the condition $C/K > 1/(10\pi)$.

The column coupling may be of tube-in-tube type comprising a first and second shaft portions connected to each other for transmitting rotation of the steering wheel therebetween, wherein the high damping rubber has a blended composition and is interposed between the first and second shaft portions.

According to another preferred embodiment of the present invention, the elastic member is a rack insulator included in the steering device, for elastically supporting a rack housing of a rack/pinion steering mechanism. In this instance also, the insulator of the rack housing may be made of a high damping rubber material having a damping property which satisfies the condition $C/K > 1/(10\pi)$.

BRIEF DESCRIPTION OF THE DRAWINGS

The present invention will now be explained in further detail hereinafter, with reference to some preferred embodiments shown in the accompanying drawings, in which:

FIG. 1 is a schematic diagram showing the steering system according to one preferred embodiment of the present invention;

FIG. 2 is a schematic diagram showing the mechanical equivalent model of the steering system of FIG. 1;

FIG. 3 is a graph showing the frequency characteristic of the gain and phase of the front steering when damping is applied only to the steering column coupling;

FIG. 4 is a graph showing the frequency characteristic of the gain and phase of the front steering when damping is applied only to the rack insulator;

FIGS. 5a and 5b are graphs for determining the maximum frequency value of the steering input frequency.

DESCRIPTION OF THE PREFERRED EMBODIMENTS

Figure 6A:
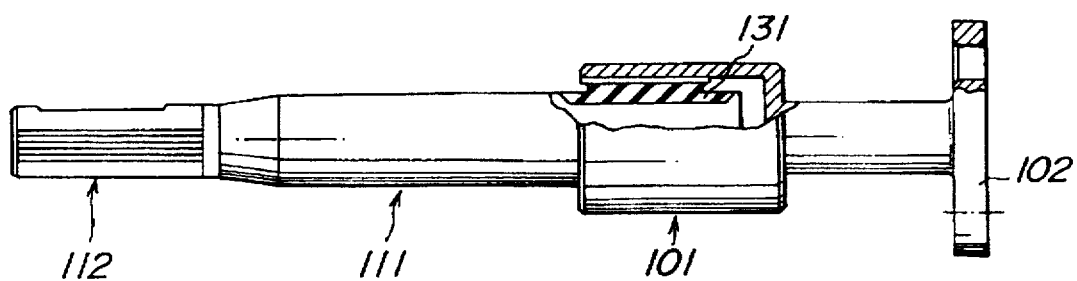
FIGS. 6a and 6b are side view and front view, respectively, of one example of the tube-in-tube type steering column coupling according to another embodiment the present invention.

Referring now to the drawings, FIG. 1 is a schematic diagram showing the steering system according to one preferred embodiment of the present invention, and FIG. 2 is a schematic diagram showing the mechanical equivalent model of steering system of FIG. 1.

In the drawings, reference numeral 1 denotes a steering wheel, and reference numeral 13 denotes a front wheel. The the steering force from the steering wheel 1 is transmitted to the wheel 13 by a steering device. The arrangement of the steering device, as well as the method for setting the value of the damping coefficient of the elastic member included in the steering device, will be explained below.

The wheel 13 is carried by a knuckle arm 12 which is connected to a rack shaft 8 of a rack/pinion steering mechanism via a side rod 11. Although only one of the front wheels is illustrated in the figures, it is to be understood that the other front wheel is connected to the rack shaft 8 in the same manner. The rack shaft 8 is supported by a rack housing 9 which is fixedly connected to a chassis of the vehicle. A pinion 7 is meshed with a rack portion of the rack shaft 8 and connected to the steering wheel 1 via a connection unit. When the pinion 7 is rotated by a manual operation of the steering wheel 1, the wheels 13 can be steered according to the translational motion of the rack shaft 8 via the side rods 11 and the knuckle arms 12 on both sides.

The steering wheel 1 is connected to the pinion 7 via a column shaft 2, an intermediate shaft 4, and a stub shaft 6. More particularly, the column shaft 2 is fitted with the steering wheel 1. The intermediate shaft 4 is connected at one end to the column shaft 2 via a joint 3. The intermediate shaft 4 on its another end is connected to the stub shaft 6 via another joint 3'. The pinion 7 is fixedly secured to the stub shaft 6 and meshed with the rack shaft 8.

Furthermore, the steering device for transmitting the steering force from the steering wheel 1 to the tires includes an elastic member, such as a steering column coupling 5 arranged at the intermediate shaft 4 and elastically deformed according to the rotation of the steering column shaft of the steering wheel, and/or a rack insulator 10 (a mount insulator) arranged between the vehicle chassis and the rack housing 9 for elastically supporting the latter. According to the present invention, at least one of such elastic members is comprised of a spring element and a damping element, and of which the ratio C/K of the damping coefficient C to the spring constant K satisfies the condition:

$$C/K > 1/(10\pi) \quad (1)$$

When the column coupling 5 or mount insulator 10 is made of rubber, a rubber material is preferably used which is a high damping rubber satisfying the abovementioned condition $C/K > 1/(10\pi)$.

At least one of the elastic members 5 and 10 illustrated in FIG. 1 may be constituted of a rubber having a high loss factor. In this instance, as shown in FIG. 2, it can be assumed that damping elements $C_0$ and $C_1$ are added to the spring elements $K_0$ and $K_1$ of the elastic members 5 and 10, respectively. Thus, a rubber material for these elastic members is appropriately selected such that the ratio (C/K) of the damping coefficient C to the spring constant K is such that C/K is greater than $1/(10\pi)$.

Instead of an elastic member made of a rubber having a high loss factor, the elastic member may comprise an orifice through which a viscous fluid is caused to flow, or the like, as disclosed in the above described patent documents.

In the steering system of the illustrated embodiment, when the steering wheel is manually operated by a driver and rotated according to the steering input, the rotation of the steering wheel 1 is transmitted, via the steering column shaft 2 and the joint 3, to the intermediate shaft 4. On this occasion, the column coupling 5 arranged at the intermediate shaft 4 is elastically deformed according to the rotation of the steering column shaft 2. Furthermore, the rotation of the the steering wheel 1 is transmitted to the stub shaft 6 via the joint 3'.

As described above, the pinion 7 is fixedly secured to the stub shaft 6 and meshed with the rack shaft 8 supported by the rack housing 9 which, in turn, is elastically supported by the rack insulator 10. Thus, the rotation of the pinion 7 according to the rotation of stub shaft 6 is converted into the translational motion of the rack shaft 8. The translational motion of the rack shaft 8 is transmitted to the wheel 13 through the side rods 11 and the knuckle arms 12, so that the amount of the translational motion of the rack shaft 8 corresponds to the steering quantity of the wheel 13.

With the steering system according to the present invention, it is possible to perform the front wheel steering operation with an excellent steering response characteristic. This is because damping is added to the elastic members of the steering device, such as the steering column coupling 5 and the rack insulator 10 in FIG. 1, and the ratio C/K of the damping coefficient C to the spring constant K is optimized so that it is higher than $1/(10\pi)$ as expressed by Expression (1). Hence, the phase characteristic of the front wheel steering angle with respect to the steering wheel operating angle is improved within a frequency band which corresponds to maneuverability and stability of the vehicle, thereby realizing an excellent steering response characteristic.

This means that the above-described effect can be realized by setting or optimizing the ratio C/K of the damping coefficient C to the spring constant K such that the frequency band which provides an increased gain and an advanced phase of the actual steering angle of the front wheel with respect to a steering wheel operating angle, can be matched with a frequency band of a steering angle generated in normal traveling. Thus, during a normal steering operation by a driver of the vehicle, the phase characteristic of the front wheel steering angle with respect to the steering wheel operating angle can be improved within a frequency band corresponding to steering stability, thereby to realize an excellent steering response characteristic and refined driving feel. It is therefore possible to satisfactorily enhance the steering response characteristic and further improve the effectiveness of the steering device including elastic members to which damping elements are added.

Referring to FIG. 2, there is shown a mechanical equivalent model of the preferred embodiment according to the present invention, wherein symbols are used to denote the following respectively.

$K_0$: spring constant of the column coupling 5
$C_0$: damping coefficient of the column coupling 5
$K_1$: spring constant of the rack insulator 10
$C_1$: damping coefficient of the rack insulator 10
$K_2$: spring constant of the tire
$\theta$: steering wheel operating angle
$\delta$: actual steering angle of the front wheel
$I$: inertia moment around a king pin shaft
$r$: effective radius of the pinion 7
$y$: displacement of the rack shaft 8 relative to the rack housing 9
$l$: effective length of the knuckle arm 12

$\theta_1$: torsion angle of the pinion 7

N: steering gear ratio

F: thrust force applied to the rack shaft 8

An equation of motion in this embodiment can be expressed as follows:

$$I \cdot (d^2/dt^2)\delta + K_2 \cdot \delta = 1 \cdot F \tag{2}$$

(Equation around the king pin shaft)

$$K_1 \cdot y + C_1 \cdot (d/dt)y = F \tag{3}$$

(Equation for the insulator)

$$K_0 \cdot (\theta - \theta_1) + C_0 \cdot \{(d/dt)\theta - (d/dt)\theta_1\} = r \cdot F \tag{4}$$

(Equation for the coupling), wherein, $$\delta = (r \cdot \theta_1 - y)/1 \tag{5}$$

$$N = 1/r \tag{6}$$

$$\frac{\delta}{\theta} = \frac{(K_0 + C_0 S)(K_1 + C_1 S)}{\left[K_1 + \frac{NK_0}{1}\right]\frac{K_2}{1} + NK_0K_1 + \left\{\left[C_1 + \frac{NC_0}{1}\right]\frac{K_2}{1} + (K_1C_0 + K_0C_1)N\right\}S + C_0C_1NS^2} \tag{7}$$

wherein S represents a Laplace operator.

Following cases (A) to (C) will be considered hereinafter.
(A) The case where damping is added only to the steering column coupling:

In this case, the rack insulator damping coefficient $C_1 = 0$ is substituted in the Equation (7). As a result, the following Equation (8) is obtained.

$$\frac{\delta}{\theta} = \frac{K_1K_0\left[1 + \frac{C_0}{K_0}S\right]}{\left\{\left[K_1 + \frac{NK_0}{1}\right]\frac{K_2}{1} + NK_0K_1\right\}\left\{1 + \frac{N\left[\frac{K_2}{1^2} + K_1\right]C_0}{\left[K_1 + \frac{NK_0}{1}\right]\frac{K_2}{1} + NK_0K_1}S\right\}} \tag{8}$$

Thus, $\delta/\theta$ is expressed by a linear/linear expression as shown in the Equation (8), and the frequency response characteristic is as shown in FIG. 3. This is a front wheel steering angle/a steering wheel angle frequency characteristic when damping is added to only the steering column coupling. As can be appreciated from FIG. 3 and Equation (8), the phase of the front wheel actual steering angle a advances with respect to the steering wheel operating angle $\delta$ to increase the gain $\delta/\theta$. The gain $\delta/\theta$ is increased at the rate of 20 dB/dec (change in gain (in dB) for every decade (dec)) within a frequency range from $F_0$ to $F_1$. In the vicinity of this frequency band, the phase of the front wheel steering angle with respect to the steering wheel operating angle is set in an advance direction. When the gain $\delta/\theta$ is increased and the phase advance effect is obtained, a time constant of the advance becomes $C_0/K_0$ in the numerator on the right side of the Equation (8), and this value determines the frequency band where the intended effect can be obtained.

In other words, in the case of a very small value $C_0/K_0$, the frequency band where the intended effect can be obtained becomes a very high frequency region, though there is actually no steering angle input so that no effect can be obtained.

(B) The case where damping is added only to the rack insulator:

In this case, the column coupling damping coefficient $C_0 = 0$ is substituted in the Equation (7). As a result, the following Equation (9) is obtained.

$$\frac{\delta}{\theta} = \frac{K_1K_0\left[1 + \frac{C_1}{K_1}S\right]}{\left\{\left[K_1 + \frac{NK_0}{1}\right]\frac{K_2}{1} + NK_0K_1\right\}\left\{1 + \frac{N\left[\frac{K_2}{1} + K_0N\right]C_1}{\left[K_1 + \frac{NK_0}{1}\right]\frac{K_2}{1} + NK_0K_1}S\right\}} \tag{9}$$

Thus, $\delta/\theta$ is expressed by a linear/linear expression in the same manner as the case (A) where the damping element with a damping coefficient $K_0$ is applied only to the steering column coupling. A frequency response is as shown in FIG. 4 which shows the frequency characteristic of the ratio of the front wheel steering angle to the steering wheel operating angle when damping is added to only the rack insulator. In this case, a time constant of the advance becomes $C_1/K_1$, which determines the frequency band where the intended effect can be obtained.

The following case can be explained as follows. (C) The case where damping is added to both the steering column coupling and the rack insulator:

In this case, the ratio $\theta/\delta$ is expressed by a quadratic/quadratic expression like the Equation (7). Since the quadratic expression $(K_0 + C_0S)(K_1 + C_1S)$ in the numerator on the right side is (linear advance) x (linear advance), the frequency band where the intended effect can be obtained is determined by $C_0/K_0$ and $C_1/K_1$ in the same manner as the cases (A) and (B) above.

If $C_0/K_0$ is very small, the effect of adding damping to the steering column coupling 5 becomes little. Likewise, if $C_1/K_1$ is very small, the effect of adding damping to the rack insulator 10 becomes little. Thus, in this instance, it is desirable that both $C_0/K_0$ and $C_1/K_1$ be set in such a manner as to correspond to the frequencies of a sufficiently large steering input.

Furthermore, attention is directed to the following points. That is to say, it is generally recognized that the frequency band of the steering input when a driver performs a steering operation during normal driving is equal to or lower than 5

Hz. This is as described in various publications, e.g., "The Development of Electric Rear Wheel Steering System," Eguchi, et al., Automobile Technique Society, previous printings of academic lectures, page 933, 1993–5, where the frequency band which provides an improved maneuverability and stability is set to 0 to 5 Hz.

Such a frequency band as 0 to 5 Hz may also connote a limit of the steering input or sensitivity of a driver. For example, FIG. 5 is a graph showing a waveform when a driver performs a stepwise steering input operation at a maximum steering speed, where the ordinate shows an operating angle of a steering wheel and the abscissa shows the time.

FIGS. 5a and 5b show the maximum value of a steering input frequency. From these figures, a time from the starting of a steering input operation till generation of the maximum steering angle is about 0.1 second. In the case of 0.1 second, the time is 0.2 seconds when converted to one cycle, i.e., 5 Hz. Although a minute gain is generated in the vicinity of 10 Hz when a steering input is processed by power spectrum, a frequency to become the main steering frequency component is 5 Hz at the maximum by ignoring such gain. Thus, a steering input of 5 Hz is considered as an actual steering input limit of a driver, is shown in FIGS. 5a and 5b.

As can be appreciated from the above description, it is necessary that $F_0$ in FIG. 3 or 4 does not exceed the steering input limit of about 5 Hz by a driver, in order to increase the gain $\delta/\theta$ by the damping element $C_0$ or $C_1$ and exhibit a phase advance effect in the steering input region (0–5 Hz) by a driver. Namely, the following Equation (10) must be satisfied:

$$F_0=K/(2\pi C)<5 \text{ (Hz)} \tag{10}$$

$$(K=K_0 \text{ or } K_1, C=C_0 \text{ or } C_1)$$

Modification of the Equation (10) results in the following Equation (11a):

$$K/C<10\pi \tag{11a}$$

Therefore, $$C/K>1/(10\pi) \tag{11b}$$

That is to say, the above Equation (1) is obtained.

Thus, the steering system according to the present invention, where damping is added to at least one suitable elastic member included in the steering device and the ratio C/K of the damping coefficient C to the spring constant K is optimized as expressed by the Equation (1), conforms well to the actual steering frequency region of a driver. Consequently, it is possible to sufficiently exhibit the primary effect of the steering system.

Furthermore, the steering system of the device can be easily, simply and properly designed by using the elastic member which satisfies the Equation (1).

Particularly, in the case where rubber is used, the present invention can be effectively realized as follows. In tuning the characteristics of the steering system with a rubber material, the characteristics are often defined according to the loss factor $(C·\omega)/K$ wherein $\omega=2\pi f$.

Multiplying $2\pi$ to both sides of the Equation (11b), $$\{(C·2\pi)/K\}>\{2\pi/10\pi\}(=0.2) \tag{12}$$

Equation (12) indicates that the loss factor when f=1 Hz, i.e., $C\times 2\pi\times 1)/K$ suffices to be more than 0.2 in the case of tuning with a rubber material.

Such rubber can be made by blending a natural rubber (NR) with a butyl rubber (IIR). Butyl rubber has a high loss factor, so that it is effective in providing a damping property though it is poor in the durability. Therefore, it is desirable that the durability should be provided by blending a natural rubber. Based on experiences, it is sufficient for the hardness of rubber to be about 60°.

In one example using such blended rubber, the spring constant K and the damping coefficient C are as follows:

$$K=0.3 \text{ kgm/deg}$$

$$C=0.0191 \text{ kgm/(deg/s)}$$

If tuning is carried out as described above, the loss factor becomes 0.4 at 1 Hz so as to satisfy the Equation (12).

Addition of the damping element serves to improve the phase characteristic of the front wheel steering angle with respect to steering wheel operating angle in the advance direction, and achieve an excellent steering response characteristic in a frequency band region which provides an improved maneuverability and stability of the vehicle. These achievements can improve the technology disclosed in JP-A-2-63963 and more effectively enhance the driving feel, simply with a tuning of rubber as described above.

Figure 6B:
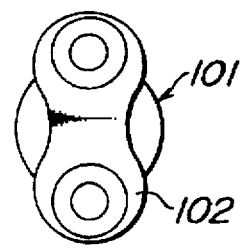

FIGS. 6a and 6b show one example of the steering column coupling using the aforementioned rubber, which is of a tube-in-tube type.

FIG. 6a is a partly broken front view of the steering column coupling and FIG. 6b is an end view thereof. The steering column coupling comprises a first shaft 101 to be fixedly connected to the steering column shaft, and a second shaft 111 to be fixedly connected to the steering gear box. The first shaft 101 has a flange-like connection 102 on its one end, through which it is fixedly connected to the steering column shaft to transmit the rotation of the steering wheel to the second shaft 111. The second shaft 111 is provided at its one end with a serration 112. The other ends of the shafts 101 and 111 are connected to each other via the aforementioned rubber.

Reference numeral 131 in FIG. 6a denotes a high damping rubber portion comprising a rubber material which is obtained by blending a natural rubber with a butyl rubber so that the ratio C/K of the damping coefficient C to the spring constant K satisfies the condition C/K>1/(10π). The rubber portion is vulcanized and bonded to the second shaft 111. A collar is disposed outside of the rubber portion 131, and press-fitted with the latter so as to connect the first and second shafts 181 and 111 to each other.

The flange-like connection 102 of the first shaft 101 is fixedly connected to the steering column shaft while the second shaft 111 is fixedly connected to the steering gear box via joints, respectively, thereby constituting a steering device with a steering column coupling.

Besides the above-described functional effect of the invention, the illustrated embodiment of the present invention is advantageous in view of its simplified structure.

With the above embodiment which uses a steering column coupling of a tube-in-tube type, the steering device is provided with two shafts for transmitting the rotation of the steering wheel from the first shaft to the second shaft, and the high damping rubber of a blended composition is interposed between the first and the second shafts. However, the tuning rubber can be used not only for the column coupling but also for a rack insulator to provide similar functional advantages.

While the present invention has been described with reference to certain preferred embodiments, they were presented by way of examples only, and it should be noted that various modifications and alterations may be made without departing from the scope of the appended claims.

For example, the present invention is can be applied to a steering device which does not include a rack-and-pinion type steering mechanism. Also, the present invention can be applied to a steering column coupling as disclosed in JP-A-4-157,210 which is not a tube-in-tube type. Furthermore, although only the rubber is used in the embodiments, a steering column coupling may be constituted of an orifice through which a viscous fluid is caused to flow as disclosed in JP-A-60-161251 or JP-A-2-63963, and the disclosure of these documents are herein incorporated by reference. The steering system according to the present invention can be realized even in the case of application to the above.

I claim:

1. A steering system for an automotive vehicle, comprising:
   a steering wheel to be manually operated by a driver; and
   a steering device for transmitting a steering input from the steering wheel to a tire of the vehicle, said steering device including an elastic member having a spring element with a spring constant and a damping element with a damping coefficient,
   wherein an actual steering angle of said tire defines a steering output of said steering device,
   wherein the elastic member has a spring constant K and a damping coefficient C such that $C/K > 1/(10\pi)$ and
   wherein the elastic member comprises blended rubber.

2. The steering system according to claim 1, further comprising a rack/pinion assembly for transmitting said steering input from the steering wheel to a tire of the vehicle.

3. The steering system according to claim 2, further comprising a rack housing, wherein said elastic member is a rack insulator for elastically supporting said rack housing on a chassis of the vehicle.

4. The steering system according to claim 3, further comprising a shaft disposed between the steering wheel and the rack/pinion assembly, wherein said elastic member is a column coupling arranged on said shaft for elastically coupling the steering wheel to the rack/pinion assembly.

5. The steering system according to claim 4, wherein the column coupling is a tube-in-tube coupling.

6. The steering system according to claim 5, wherein the column coupling comprises rubber.

7. The steering system according to claim 4, wherein the column coupling includes an orifice through which viscous fluid flows through and the spring constant and the damping coefficient are a function of the flow of the viscous fluid through the orifice.

8. The steering system according to claim 1, wherein the blended rubber comprises a blend of natural rubber and butyl rubber.

9. A steering system for an automotive vehicle, comprising:
   a steering wheel to be manually operated by a driver; and
   a steering device for transmitting a steering input from the steering wheel to tires of the vehicle, each of said tires being carried by a knuckle arm with a length l and having a spring constant $K_2$, said steering device including
   a rack/pinion steering gear mechanism having a gear ratio N accommodated in a housing which is elastically supported on a body of the vehicle by an elastic insulator comprised of a spring element having a spring constant $K_1$ and a damping element having a damping coefficient $C_1$,
   a steering column shaft connected to the steering wheel, and
   an elastic column coupling arranged between the steering column shaft and a pinion of the rack/pinion steering gear mechanism, said elastic column coupling comprised of a spring element having a spring constant $K_0$ and a damping element having a damping coefficient $C_0$,
   wherein an actual steering angle of said tires defines a steering output of said steering device,
   wherein one of the elastic insulator and the elastic column coupling has a spring constant K and a damping coefficient C such that $C/K > 1/(10\pi)$, and
   wherein said one of the elastic insulator and the elastic column coupling comprises blended rubber.

10. The steering system according to claim 9, wherein a frequency ($F_0$) is determined by said elastic column coupling and expressed by the following equation:

$$F_0 = \frac{K_0}{2\pi C_0} \text{ (Hz)}$$

11. The steering system according to claim 10, wherein said column coupling is made of a high damping rubber material having a damping property which satisfies the condition $C_0/K_0 > 1/(10\pi)$.

12. The steering system according to claim 11, wherein said column coupling is a tube-in-tube coupling and comprises a first shaft portion and a second shaft portion connected to each other for transmitting rotation of the steering wheel therebetween, wherein the high damping rubber material is interposed between the first and second shaft portions.

13. The steering system according to claim 9, wherein said frequency ($F_0$) is determined by said elastic insulator and is expressed by the following equation:

$$F_0 = \frac{K_1}{2\pi C_1} \text{ (Hz)}$$

14. The steering system according to claim 13, wherein said elastic insulator is made of a high damping rubber material having a damping property which satisfies the condition $C_1/K_1 > 1/(10\pi)$.

15. The steering system according to claim 9, wherein the column coupling is a tube-in-tube coupling.

16. The steering system according to claim 15, wherein the column coupling comprises rubber.

17. The steering system according to claim 9, wherein the column coupling includes an orifice through which viscous fluid flows through and the spring constant and the damping coefficient are a function of the flow of the viscous fluid through the orifice.

18. The steering system according to claim 9, wherein the elastic insulator comprises a blend of natural rubber and butyl rubber.

19. The steering system according to claim 9, wherein the elastic column coupling comprises a blend of natural rubber and butyl rubber.

20. A method for tuning steering characteristics of an automotive vehicle, said method comprising the steps of:
   determining a spring constant K of an elastic member to be arranged in a steering device of said automotive vehicle;
   determining a damping coefficient C of the elastic member; and if the spring constant K and the damping coefficient C have a ratio C/K which is less than $1/(10\pi)$, then selecting a blended rubber whose damping coefficient C' and spring constant K' are such that $C'/K'>1/(10\pi)$ as the elastic member.

21. The method according to claim 20, wherein a blend of natural rubber and butyl rubber is selected as the elastic member.

* * * * *